UNITED STATES PATENT OFFICE.

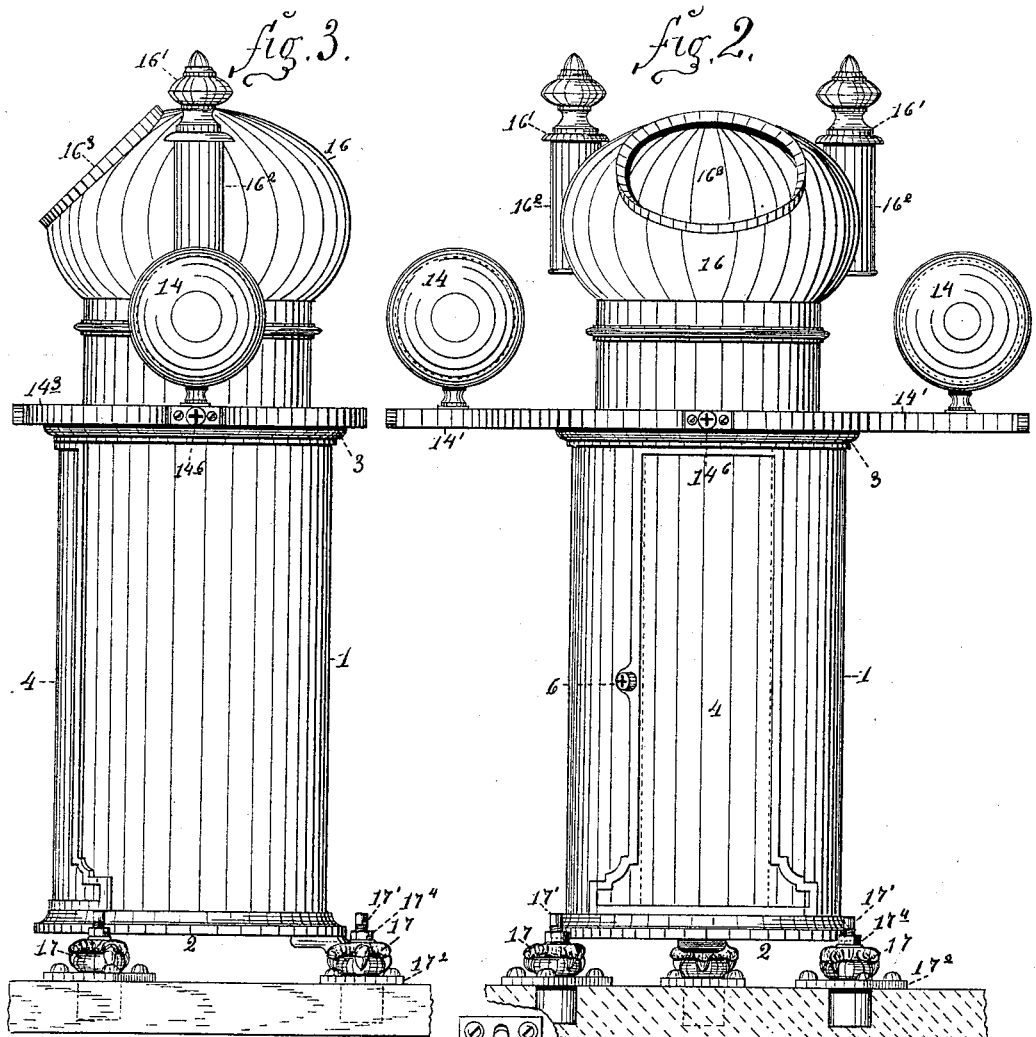

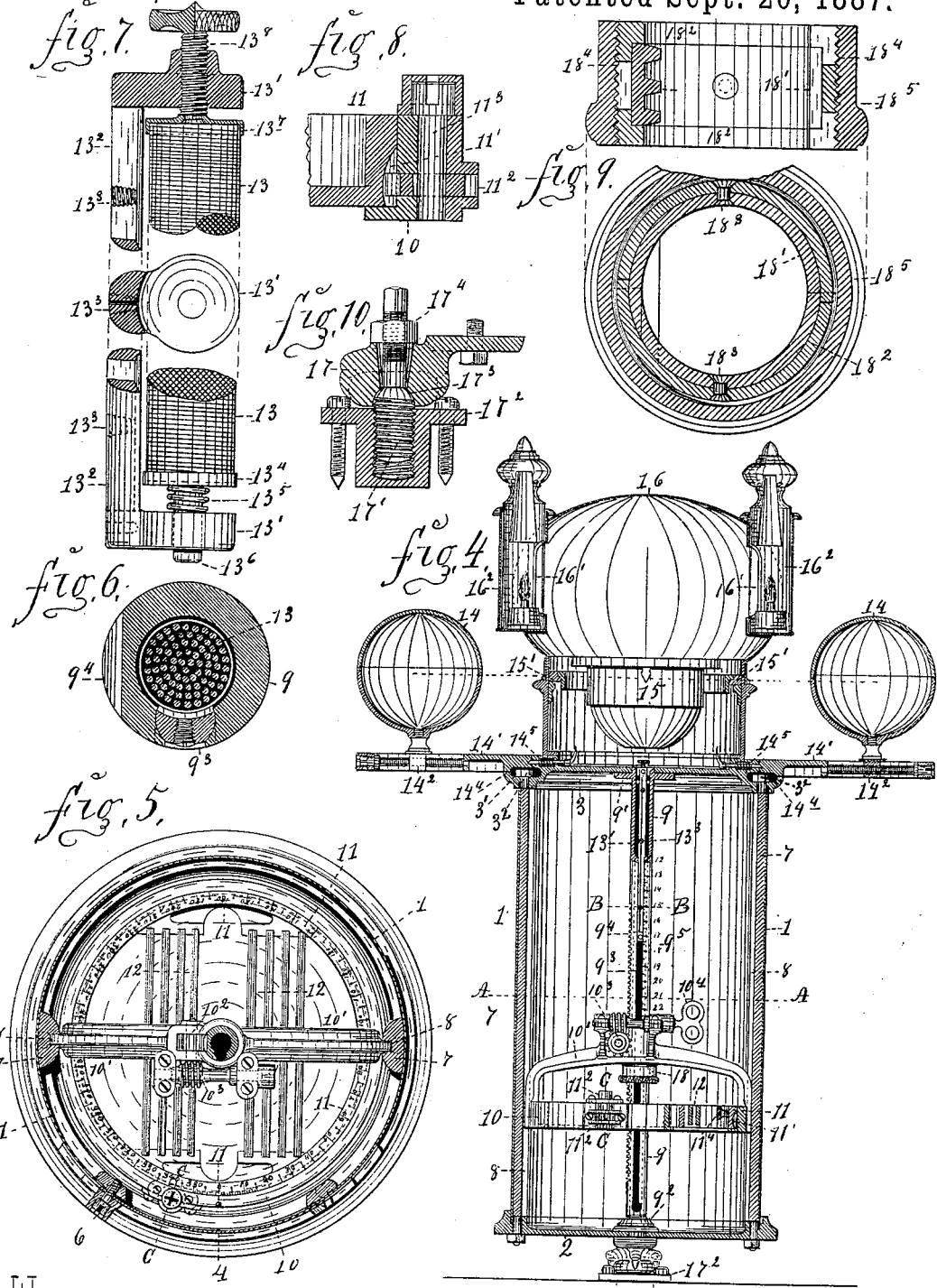

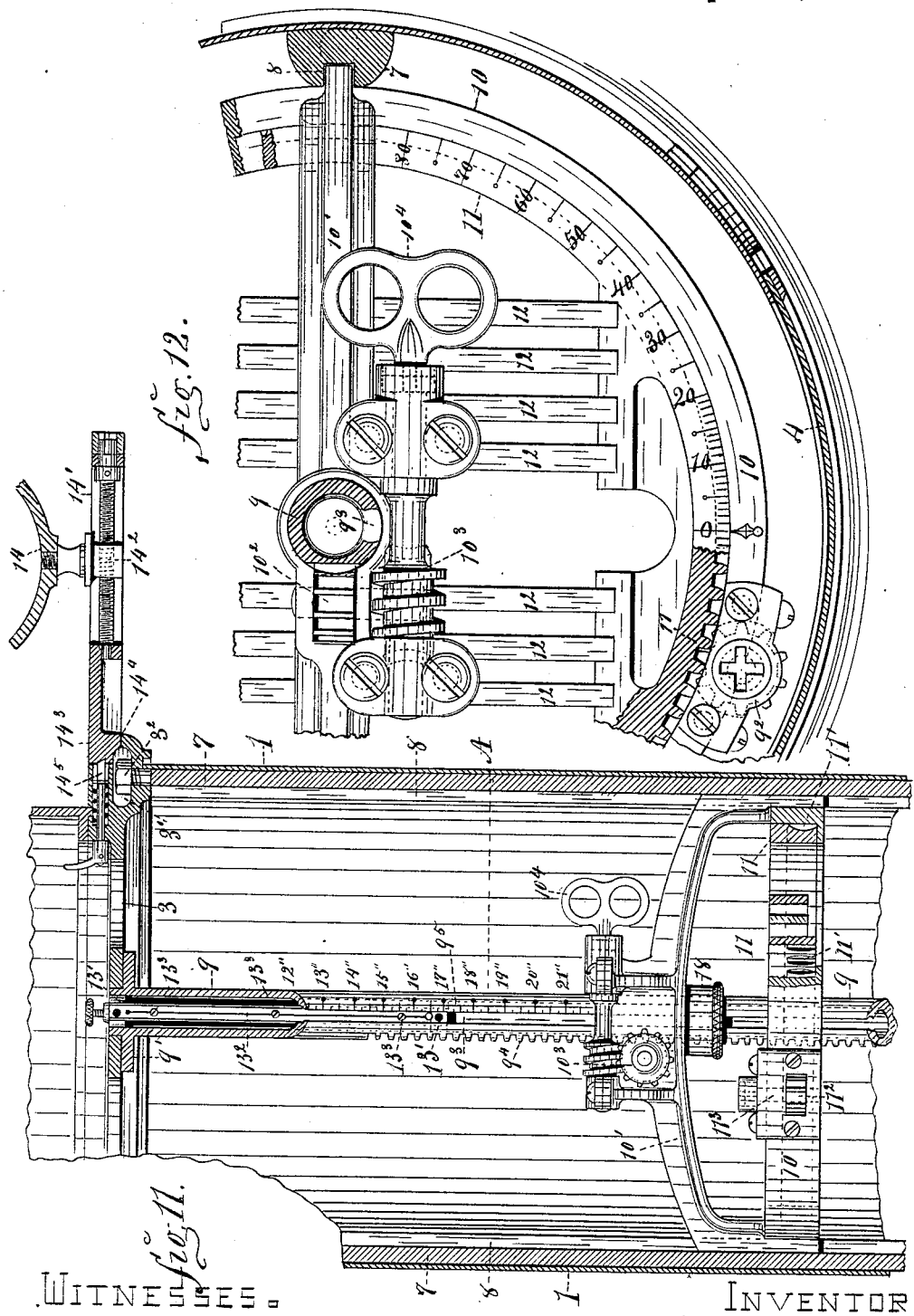

FRANK W. CROSS, OF WASHINGTON, DISTRICT OF COLUMBIA.

SHIP'S BINNACLE.

SPECIFICATION forming part of Letters Patent No. 370,248, dated September 20, 1887.

Application filed March 23, 1887. Serial No. 232,157. (No model.)

*To all whom it may concern:*

Be it known that I, FRANK W. CROSS, a citizen of the United States, residing at Washington, in the District of Columbia, have invented certain new and useful Improvements in Ships' Binnacles; and I do hereby declare the following to be a full, clear, and exact description of the invention, such as will enable others skilled in the art to which it appertains to make and use the same.

My invention relates to improvements in the construction of binnacles, which contain, protect, and support the navigators' compass employed in determining the course of their ships.

The object of my invention is the introduction of new mechanical devices for regulating and holding securely in the desired position the horizontal and vertical compensating magnets, which prevents the disturbance of the compass or needle from external influences, such as the iron in the ship's construction, the cargo, or sunken reefs, or magnetic currents of the earth.

The column or base of the binnacle can be made in any desired form; but I by preference make it cylindrical, of sheet-brass, with a cast bottom and top of the same material, held securely together by two stanchions, one on each side, and bolted at the top and bottom. A slide-door is made in the front to give egress to the interior. On the top of the stand or column is placed the compass, with its hood containing the lanterns for illuminating the dial-card, and a window for observation. Attached to the top is a ring having two arms opposite each other, which support two iron globes, the axis of which corresponds with the plane of the needle. These globes are movable on the arms, to adjust them at proper distances from the compass. The distance is indicated by a scale of inches on the arms. They are also movable in a circle around the compass, the position being indicated by a scale of degrees marked on the supporting-ring, with a zero-mark on the stationary top of the binnacle-base. Centrally in the cylindrical base is placed a strong vertical tube fastened securely to the top and bottom. In the side of this tube fronting the door is cut a slot from top to bottom, in which is secured a carrier for the vertical magnet, which is placed in the inside of the tube. The magnet is secured in the carrier by a thumb-screw at the top with a tension-spring at the bottom. The bar connecting the heads of the carrier has convex sides, which work in concaves cut in the slot, and adjustable vertically by means of wedge-shaped or conical set-screws, which expand the bar, (it being slotted,) securing it at any point in the vertical tube. The ring or bowl carrying the horizontal magnets is also supported by this vertical tube by a bail encircling the tube, in which is arranged a pinion engaging in a rack cut in the side of the tube. This pinion is worked by a worm-gear placed on the shaft of the pinion, by means of which the bowl can be raised or lowered at will for adjusting the magnets at a suitable distance from the compass, depending upon the strength of the magnets. There is also placed on the vertical tube under the bail of the magnet-bowl a lock-nut, having teeth projecting inward, (conforming to the rack,) which is formed in halves for arranging on the rack, and firmly secured by a nut screwed on the outside. This precaution is taken for additional security to the magnet-bowl, to prevent its movement by jars or motion of the ship. There is a scale of inches marked on the central tube for determining the distance of the vertical magnet from the plane of the needle. The horizontal magnets are secured in a ring arranged in the inside of the bowl or ring, and can be turned horizontally by a pinion attached to the outer ring, which engages with a rack cut in the outer face of the magnet-ring, which ring is secured after adjustment by a thumb-screw. A scale of degrees is cut on the upper face of the magnet-ring, with zero-mark on the ring of the bowl, which is to determine the angularity of the horizontal magnets with the magnets in the compass-bowl.

To facilitate the leveling up of the instrument with the vessel, socket-plates are secured to the deck having adjustable ball-joint screws, by which the feet of the base of the binnacle are adjusted and secured by a jam-nut on the top of the feet.

That my invention may be better understood, reference is had to the accompanying drawings, in which—

Figure 1 represents a plan view of my improved binnacle; Fig. 2, a front elevation; Fig. 3, a side elevation; Fig. 4, a sectional elevation, showing the arrangement of parts in the interior; Fig. 5, an enlarged horizontal section at A, Fig. 4, looking downward, showing the device for raising or lowering the magnet bowl. Fig. 6 is a cross-section of the central tube and vertical magnet and carrier at B, Fig. 4, full size. Fig. 7 is a sectional view of the vertical magnet and magnet-carrier, full size. Fig. 8 is an enlarged cross-section of the magnet-bowl and ring at C C, Fig. 5, showing the pinion by which the magnet-ring is turned in the bowl. Fig. 9 shows the construction of the lock-nut, full size; and Fig. 10 is an enlarged sectional view of the adjusting device for the feet of the binnacle. Fig. 11 is an enlarged view of the devices shown in Fig. 4, and Fig. 12 is an enlarged view of the devices shown in Fig. 5.

Similar figures represent corresponding parts in all the views.

In the drawings, 1 indicates the cylindrical housing, of sheet or rolled brass and secured in bottom plate, 2, by a flange and groove; 3, the top plate or cover, also provided with a flange and groove for the cylinder, with a recess or groove, 3', turned out of the upper side on the edge to give space for the securing-nuts $3^2$, and 4 the slide-door, which is secured by a capped screw, 6, turned by a cross-key. 7 indicates the vertical stanchions which secure the bottom and top to the shell 1; 8, grooves on the inside of the stanchions cut from top to bottom, forming guides for the magnet-bowl; 9, the vertical tube secured at the top by the flange 9' and at the bottom by an adjusting-nut, $9^2$; $9^3$, the slot in the front side of the tube; $9^4$, the rack cut in the side, and $9^5$ the scale of inches marked on the front side. 10 indicates the magnet-bowl; 10', the bail by which it is suspended; $10^2$, the pinion which forms connection between the bail and the rack $9^4$ cut in the side of the tube 9; $10^3$, the worm-gear connected with the pinion for raising or lowering the bowl 10, and $10^4$ a key for turning the worm. 11 is the magnet-ring in which the horizontal magnets are mounted, having the scale of degrees marked on its upper face to indicate the number of degrees of variation; 11', the rack cut on the back of the ring; $11^2$, the pinion engaging with the rack; $11^3$, the key-shaft to turn the pinion $11^2$ to adjust the magnet-ring 11, in which are secured the horizontal magnets 12.

13 indicates the vertical magnet which is held by the jaws 13' of the split bar $13^2$.

$13^3$ are the conical-shaped pinch-screws for expanding the split bar $13^2$ in the slot $9^3$ cut in the vertical tube 9. The lower end of the vertical magnet 13 stands in a socket, $13^4$, resting on a spiral spring, $13^5$, and guided by the stem $13^6$. The upper end of the magnet is held by the swivel-cap $13^7$ and adjusted by the thumb-screw $13^8$. Thus by means of the conical pinch-screws $13^3$ the vertical magnet 13 can be adjusted and secured at any point required in the length of the vertical tube 9, the distance from the compass being indicated by the scale of inches marked on the tube. 14 are the iron balls secured to projecting arms 14', and adjusted in the arms by the screw and nut $14^2$, the distance of the balls from the compass being indicated by a scale of inches marked on the face of the arms. These arms are formed on a ring or band, $14^3$, encircling the binnacle, resting in a rabbet, $14^4$, formed in the cover 3 of the pedestal, and held in place by spring-catches $14^5$, which engage in a groove cut around the entire circle in the inside of the ring, allowing the ring and balls to be turned round the binnacle, preventing movement in a vertical direction, and allowing it to be fixed at any point (indicated by degrees marked on the face of the ring) by a set-screw, $14^6$.

15 is the bowl containing the compass, and mounted on gimbal-point 15' in the usual manner.

16 is a hood to protect the compass; 16', lanterns for illumination arranged in sockets $16^2$, formed in the opposite sides of the hood 16 and at right angles with the window $16^3$, through which is seen the card or dial of the compass. 17 indicates the feet of the binnacle, which are secured to the deck of the vessel by means of the adjusting-screws 17' and socket-plate $17^2$, which is let into and bolted to the deck. The feet 17 and adjusting-screw 17' have a ball-and-socket connection, $17^3$. To prevent the screws from turning or moving after the level of the binnacle has been adjusted jam-nuts $17^4$ are provided. The lock-nut 18 is composed of several parts. (See Fig. 9.) The inner ring, 18', is made in two pieces with rack-teeth formed on one half, which pieces are secured in a recess turned out of the ring $18^2$, and secured therein by rivets $18^3$. This ring is also formed in halves and tongued together. This is done in order that the ring may be opened to adjust the nut on the rack cut on the side of the supporting central tube, 9. A screw-thread, $18^4$, is cut on the outside of the ring $18^2$, over which is screwed a solid ring, $18^5$, having a corresponding internal thread forming the lock-nut.

In this application I do not claim any invention in relation to the influences of the magnets and iron balls upon the compass or their position, that having been known and in use; but What I do claim as new and useful and of my invention, and desire to secure by Letters Patent, is—

1. In a ship's binnacle, the central vertical supporting-tube, 9, which is bolted or secured to the top or cover plate, 3, having an adjusting-nut, $9^2$, at the bottom, a slot, $9^3$, cut from the bottom to the top and through the flange for the introduction of the vertical magnet, a toothed rack, $9^4$, cut in the side, and a scale of inches marked on the front side, substantially as and for the purposes set forth.

2. In a ship's binnacle, the central supporting-tube, 9, having a rack, $9^4$, in combination with the magnet-bowl 10, bail 10', pinion $10^2$, and worm-gear and worm $10^3$, substantially as and for the purposes described.

3. In a ship's binnacle, the combination of a magnet-bowl, 10, capable of vertical adjustment, magnet-ring 11, the rack 11', cut in the magnet-ring, pinion $11^2$, attached to the magnet-bowl, and key-shaft $11^3$, substantially as and for the purposes specified.

4. The central supporting-tube, 9, in combination with the vertical magnet 13, head-pieces 13', split connecting-bar $13^2$, conical pinch-screws $13^3$, base-socket $13^4$, spiral spring $13^5$, guide-stem $13^6$, swivel-cap $13^7$, and thumb-screw $13^8$, substantially as and for the purposes described.

5. In a ship's binnacle, a top plate, 3, and movable band or ring $14^3$, provided with a groove cut in its inner surface, in combination with the spring-catches $14^5$, which allow the ring to be revolved, but at the same time prevent its movement in a vertical direction, substantially as and for the purposes set forth.

6. A ship's binnacle having a bottom plate, 2, in combination with the adjustable feet 17, adjusting-screw 17', socket deck-plate $17^2$, socket or ball joint $17^3$, and jam-nut $17^4$, substantially as and for the purposes specified.

7. In a ship's binnacle, the central supporting-tube, 9, and magnet-bowl 10, in combination with the set-nut 18, composed of the rack-ring 18', screw-ring $18^2$, which are made in halves, and binding nut or ring $18^5$, substantially as and for the purposes described.

In testimony whereof I affix my signature in presence of two witnesses.

FRANK W. CROSS.

Witnesses:
JOSEPH E. HOLMES,
CHAS. F. MYERS.